(12) United States Patent
Atkins et al.

(10) Patent No.: US 7,946,134 B2
(45) Date of Patent: May 24, 2011

(54) MCVD OPTICAL FIBER METHOD WITH PARTIAL REMOVAL OF SUBSTRATE TUBE

(75) Inventors: Robert M. Atkins, Millington, NJ (US); James W. Fleming, Westfield, NJ (US); Paul F Glodis, Atlanta, GA (US); Man F. Yan, Berkeley Heights, NJ (US)

(73) Assignee: OFS Fitel, LLC, Norcross, GA (US)

( * ) Notice: Subject to any disclaimer, the term of this patent is extended or adjusted under 35 U.S.C. 154(b) by 0 days.

(21) Appl. No.: 12/799,561

(22) Filed: Apr. 27, 2010

(65) Prior Publication Data

US 2010/0287993 A1 Nov. 18, 2010

Related U.S. Application Data

(63) Continuation of application No. 11/444,754, filed on May 31, 2006, now abandoned, which is a continuation of application No. 10/366,888, filed on Feb. 14, 2003, now abandoned.

(51) Int. Cl.
*C03B 37/018* (2006.01)

(52) U.S. Cl. .............. 65/412; 65/417; 65/429; 65/419

(58) Field of Classification Search .............. 65/412, 65/417, 429, 419
See application file for complete search history.

(56) References Cited

U.S. PATENT DOCUMENTS

| | | | | |
|---|---|---|---|---|
| 5,013,131 A * | 5/1991 | Fotheringham | ............... | 385/124 |
| 5,120,444 A * | 6/1992 | Clasen | ............... | 210/639 |
| 5,154,745 A * | 10/1992 | Le Sergent | ............... | 65/391 |
| 6,105,396 A * | 8/2000 | Glodis et al. | ............... | 65/377 |
| 6,769,275 B2 * | 8/2004 | Guskov et al. | ............... | 65/414 |
| 2002/0150333 A1 * | 10/2002 | Reed et al. | ............... | 385/34 |

* cited by examiner

*Primary Examiner* — John Hoffmann
(74) *Attorney, Agent, or Firm* — Law Offices of Peter V. D. Wilde, Esq

(57) ABSTRACT

The specification describes methods for the manufacture of very large optical fiber preforms wherein the core material is produced by MCVD. Previous limitations on preform size inherent in having the MCVD starting tube as part of the preform process are eliminated by removing the MCVD starting tube material from the collapsed MCVD rod by etching or mechanical grinding. Doped overcladding tubes are used to provide the outer segments of the refractive index profile thus making most effective use of the MCVD produced glass and allowing the production of significantly larger MCVD preforms than previously possible.

9 Claims, 5 Drawing Sheets

MCVD OPTICAL FIBER METHOD WITH PARTIAL REMOVAL OF SUBSTRATE TUBE

RELATED APPLICATION

This application is a continuation of application Ser. No. 11/444,754, filed May 31, 2006, now abandoned which is a continuation of Ser. No. 10/366,888, filed Feb. 14, 2003 now abandoned.

FIELD OF THE INVENTION

This invention relates to optical fiber manufacture, and more specifically to improved optical fiber preform fabrication techniques.

BACKGROUND OF THE INVENTION

Manufacture of optical fiber performs, the glass blanks from which optical fibers are drawn, typically involves a rotating lathe, where pure glass or glass soot is formed on a rotating member by chemical vapor deposition or a modification thereof. All successful methods of fiber manufacture should assure that the optical quality and purity of the preform glass is high. In particular, the glass making up the central portion or core of the preform should be of the highest purity since most of the optical power in the fiber will be carried within this region. A significant advance in this direction occurred with the introduction of the so-called Modified Chemical Vapor Deposition (MCVD) process in which the glass-forming precursors are introduced into a rotating hollow starting tube, and glass material is deposited on the inside wall of the hollow tube. The better control over the reaction environment provided by this inside deposition process, allowed exceptionally pure glass to be produced in the critical core region.

The MCVD technique has evolved to a highly sophisticated manufacturing technique, and is widely used in commercial practice today. However, limiting aspects in MCVD and similar inside deposition processes are the size and quality of the starting tube and the total amount of glass that can be deposited carried out in an overcladding process. The overcladding process in general is inside a starting tube. The limitation on the total amount of deposited glass necessarily limits the number of distinct doped regions or segments of a given size that can be accommodated in a preform of this type.

Another preform fabrication technique, Vapor Axial Deposition (VAD), was developed in which the CVD-formed silica soot deposits and grows axially from a starting mandrel. In a subsequent manufacturing stage or stages, the soot body is purified, dried and sintered into pure glass. At some point, the mandrel is separated from the deposited body and the entire preform, unlike MCVD, may thus be made of CVD-deposited material. As a general proposition, VAD to methods are effective and widely practiced, but they still do not match the ability of MCVD to control precisely the radial deposition profile of index changing dopants such as germanium and fluorine. Because of this, VAD methods and other soot deposition/subsequent sintering methods such as Outside Vapor Deposition (OVD) are limited in the complexity of the fiber designs that can be efficiently produced.

Considering that in a single mode optical fiber the core and inner cladding together carry greater than 95% of the optical power but typically comprise less than 5% of the fiber mass, all manufacturing processes focus special attention on the fabrication of this region. This has resulted in approaches to preform manufacture, where the core and inner cladding regions of the preform are produced by a relatively advanced and expensive method, while the outer cladding, the bulk of the preform, may be produced by a less demanding, and less expensive process. The integration of the core rod and the cladding is carried out in an overcladding process. The overcladding process in general is described for example in U.S. Pat. No. 6,105,396 (Glodis et al), and PCT/EPT00/02651 (25 Mar. 2000), which are incorporated herein by reference for details of the general techniques. The overcladding process may consist of multiple steps, each adding a distinct cladding region, if this is required by the complexity of the desired fiber refractive index profile. The most prevalent process of this type is the so-called rod-in-tube method, where the core rod is made by a very high quality dopant-versatile process, and the cladding tube is often made of less expensive, lower purity or single composition glass. In the to rod-in-tube overcladding process, the core rod is inserted into the cladding tube, and the tube collapsed around the rod to form a unitary body. Again, multiple overcladding steps may be used and in some cases one or more of the final overcladding processes may be combined with the fiber drawing operation.

State of the art manufacture for very large preforms now makes use of core rods produced by Outside Vapor Deposition or Vapor Axial Deposition. If a tube overcladding process is used, suitable cladding tubes may be produced by soot deposition or extrusion of fused quartz. Making these very large cladding bodies with a soot based synthetic glass process leads to high quality glass but requires extensive processing and is relatively expensive. Large bodies of fused quartz are less expensive but are generally not of sufficient purity for large preforms. A more economical approach for making high quality cladding tubes is to use sol-gel techniques. This well-known procedure is described, for example, in J. Zarzycki, "The Gel-Glass Process", pp. 203-31 in Glass: Current Issues, A. F. Wright and J. Dupois, eds., Martinus Nijoff, Boston, Mass. (1985). Sol-gel techniques are regarded as potentially less costly than other known preform fabrication procedures. Options for producing the cladding tubes are addressed here for completeness, but the focus of this invention is on the core rod. The term core rod is used for convenience since the core rod always contains the central core material. However, the rod may comprise inner cladding, or both inner and outer cladding, as well as the central core. These options will be described in more detail below.

For producing very high quality central core and inner cladding material, to the MCVD process would appear ideal. However, the MCVD starting tube can be a limiting factor in several ways. The most direct limitation is when the glass in the MCVD starting tube is simply not of sufficient quality and low loss for large state of the art preforms (where some fraction of the optical power would be carried by the starting tube material). If the initial tube quality limitation is avoided by the use of ultra pure (and typically expensive) material to fabricate the starting tube, the exposure of the tube to the oxy-hydrogen torch typically used in MCVD as a heat source can compromise the effective starting tube quality by the addition of hydroxyl ions to a significant depth. Finally, the desired refractive index profile may require a dopant level in the region provided by the starting tube glass that is not compatible with successful MCVD processing (viscosity, tube stability or heat transfer considerations).

It should be evident from the discussion above that the production of very large core rods for rod in tube methods appears to be most suitably accomplished by VAD or OVD type methods. While the MCVD process is capable, along with the VAD and OVD processes, of producing very high quality glass, the MCVD glass is deposited inside a starting tube which, because of the reasons outlined above, can disadvantageously limit the application of the rod in tube method to preforms below a given size.

SUMMARY OF THE INVENTION

We have developed a technique that allows the use of MCVD for producing large preform core rods in a rod-in-tube process. High-quality glass is deposited on the inside of a MCVD starting tube, and the tube collapsed in the usual manner to form a solid rod. The starting tube, at this point the outside shell of the rod, is then removed from the solid rod leaving just MCVD-deposited material. The rod is then inserted into a cladding tube and the cladding tube collapsed to form the preform. The preform, following this method, has a core region consisting entirely of MCVD deposited material. Optionally, one or more inner cladding segments may be deposited along with the central core during the MCVD process, and the preform completed by the application of one or more cladding layers over the MCVD central core and inner cladding layers.

In a preferred embodiment, the overcladding operation is accomplished by controlling the atmosphere in the gap between the MCVD rod and the overcladding tube in much the same way that the original MCVD process carries out the glass forming reaction inside a tube to isolate the glass forming reaction from the environment.

DETAILED DESCRIPTION

Figure 1:
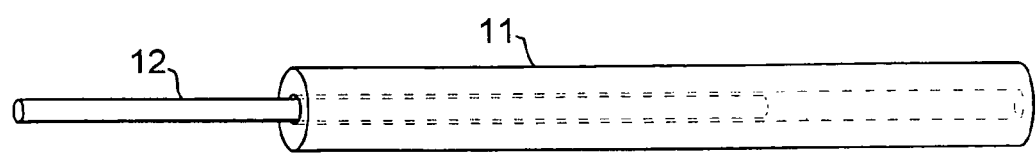
FIGS. 1 and 2 are schematic representations of a rod-in-tube process for the manufacture of optical fiber preforms.
Figure 2:
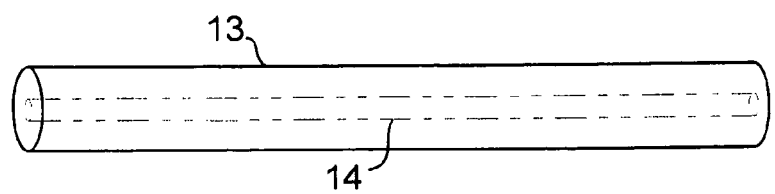

Typical rod-in-tube methods are described in conjunction with FIGS. 1 and 2. It should be understood that the figures referred to are not necessarily drawn to scale. A cladding tube representative of dimensions actually used commercially has a typical length to diameter ratio of 10-15. The core rod 12 is shown being inserted into the cladding tube 11. There exist several common options for the composition of the core rod. It may be pure silica, adapted to be inserted into a down-doped cladding tube. It may have a pure silica center region with a down-doped inner cladding region. It may have an up-doped, e.g. germania doped, core region surrounded by a pure silica cladding region. It may have an up-doped center core region surrounded by a down-doped inner cladding region. All of these options, and many variations and elaborations, are well known in the art and require no further exposition here. However, the preferred embodiment of the invention is aimed at the case where the core rod has either a central core region (only) or a central core region and one cladding region with the remaining cladding regions or segments provided by the overcladding process. This takes full advantage of the MCVD process and allows a substantial increase in preform size relative to prior art. A typical profile has a central core of up-doped material, typically germanium doped, and at least one un-doped, neutrally-doped or down-doped region adjacent to the germanium-doped central core region. Although such a profile utilizes the advantages of the MCVD process, it should be understood that the invention is not so limited. It may be applied to the production of simple un-doped core rods. Or it may be applied to making just a germanium up-doped core. In most cases, other profile regions of differing refractive index will be formed by one or more doped cladding tubes. Cladding tubes made with very high quality glass-forming techniques may be used for most or even all of the cladding layers. In the latter case, the MCVD process needs to supply only the central core region and standard single mode preforms equivalent to several thousand kilometers of fiber per preform meter can be achieved.

After assembly of the rod 12 and tube 11, the tube is collapsed onto the rod to produce the final preform 13, shown in FIG. 2, with the core rod 14 indistinguishable from the cladding tube except for a small refractive index difference.

Figure 3:
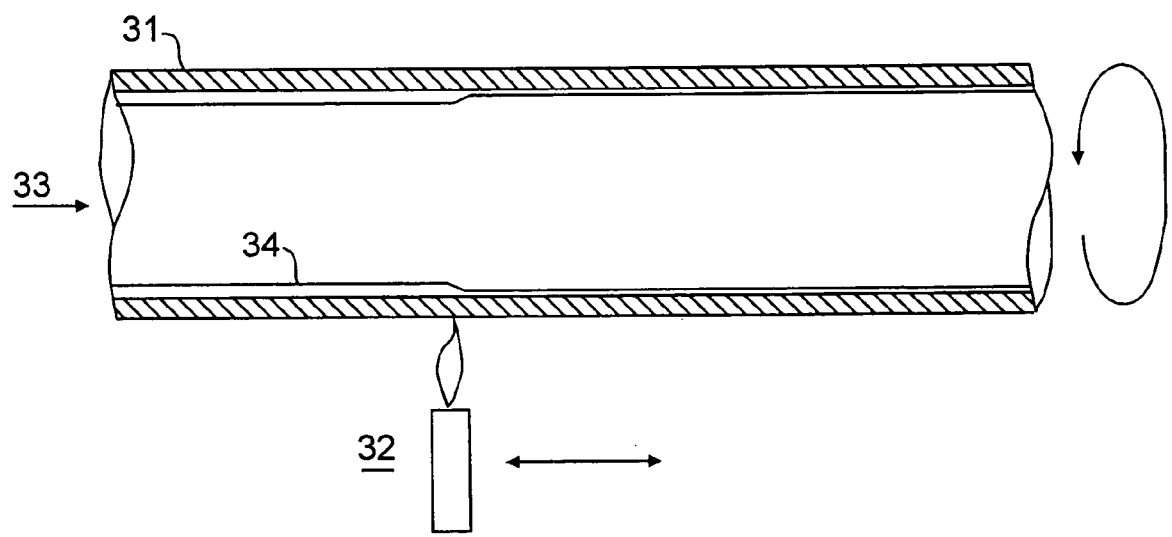
FIG. 3 is a schematic representation of an MCVD process showing deposition of high purity glass on the interior walls of the MCVD starting tube.

FIG. 3 represents a typical MCVD method. The starting tube is shown at 31. An oxy-hydrogen torch 32 traverses the length of the outside of the tube while the tube is rotating. Glass precursor materials, typically $SiCl_4$ and dopants such as $GeCl_4$, are introduced into the interior tube at 33. When the glass precursors reach the hot zone, they form a soot deposit 34 downstream of the torch on the tube wall as shown. This soot layer is sintered into glass as the torch traverse moves the hot zone downstream. Multiple passes form thicker glass deposits, and allow the composition of the glass deposit to vary radially from the tube center. The MCVD process is well known, and details of the process need no exposition here. See for example, J. B. MacChesney et al, "Preparation of Low Loss Optical Fibers Using Simultaneous Vapor Phase Deposition and Fusion", Xth Int. Congress on Glass, Kyoto, Japan (1973) 6-40.

According to the invention, most, and preferably all, of the central core material is deposited inside the MCVD tube. The ratio of the central core diameter to the preform diameter for a typical single mode fiber preform is in the range $1/10$ to $1/20$. As the desired preform size increases, the required central core size will necessarily increase. In conventional MCVD, the MCVD starting tube limits the amount of deposited central core material to a relatively small fraction of the total amount of MCVD material. This is often expressed as the clad to core ratio or D/d ratio where D refers to the diameter of the total MCVD deposition (central core plus deposited cladding) and d refers to the diameter of the central core structure. Typical values of the D/d ratio for a simple single mode fiber design made by conventional MCVD with a commercial quality starting tube and designed to match a conventional overcladding process are in the range of 2.0 to 4.0. In the method of the invention, there is no limit to the proportion of MCVD material that can be used for the core since the MCVD tube is not intended to be used in the final preform structure.

That is to say, the invention allows the attainment of the optimum D/d=1.0 ratio for a large preform. In this case, 100% of the MCVD material is used to form the central core. The cladding will be applied later in the overcladding process, after removal of the starting tube, and each cladding can be any desired thickness where the final preform diameter is in proportion to the central core diameter. This allows multiple doped (or undoped) layers, of essentially any desired thickness and sequence, to be incorporated in the preform design. Since the preform size scales as the inverse square of the D/d ratio, a clad to core ratio of 1.0 would provide a factor of 4 increase in preform size compared to a conventional MCVD single mode fiber process with a D/d ratio of 2.0. While a D/d ratio of 1.0 corresponds to the largest possible preform size for a given amount of MCVD deposition, in some cases it may be advantageous to deposit the central core and an inner cladding region or regions by MCVD. In that case the clad to core ratio will be greater than 1.0 but can still provide a significant advantage in comparison with standard MCVD practice. For example, if a central core and adjacent inner cladding with equivalent amounts of deposition are produced by MCVD, the clad to core ratio would be $\sqrt{0}$. Such a preform would still be twice as large as a conventional MCVD preform with a clad to core ratio of 2.0, both preforms having the same total amount of MCVD deposit.

Figure 4:
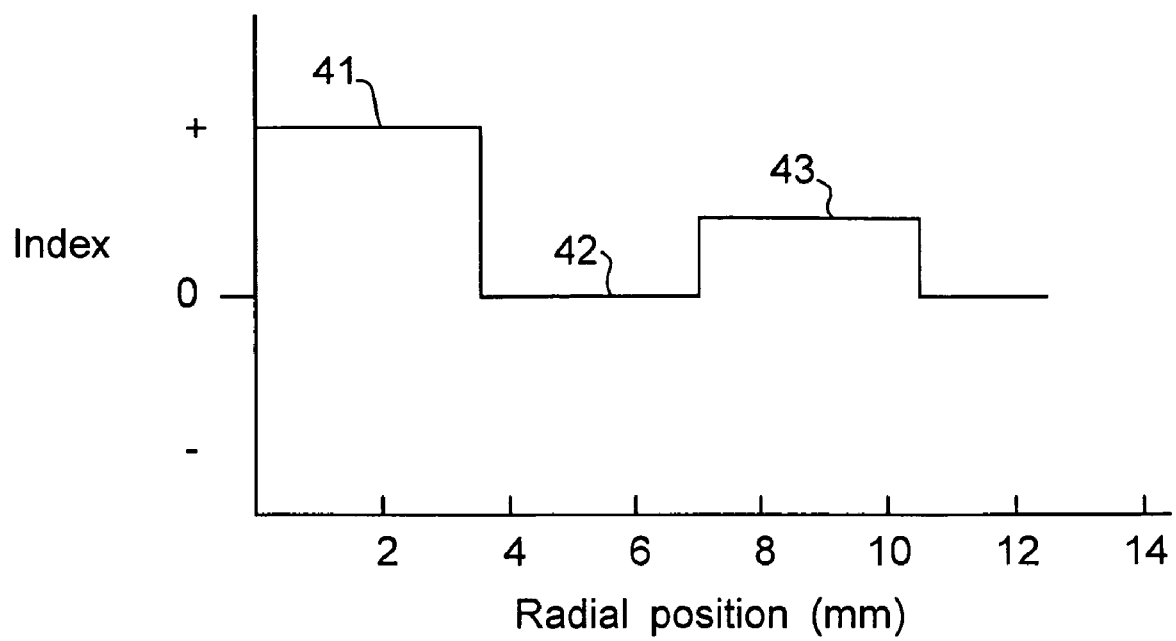
FIGS. 4 and 5 are schematic diagrams of preform profiles that are among those adapted to be produced by the method of the invention.
Figure 5:
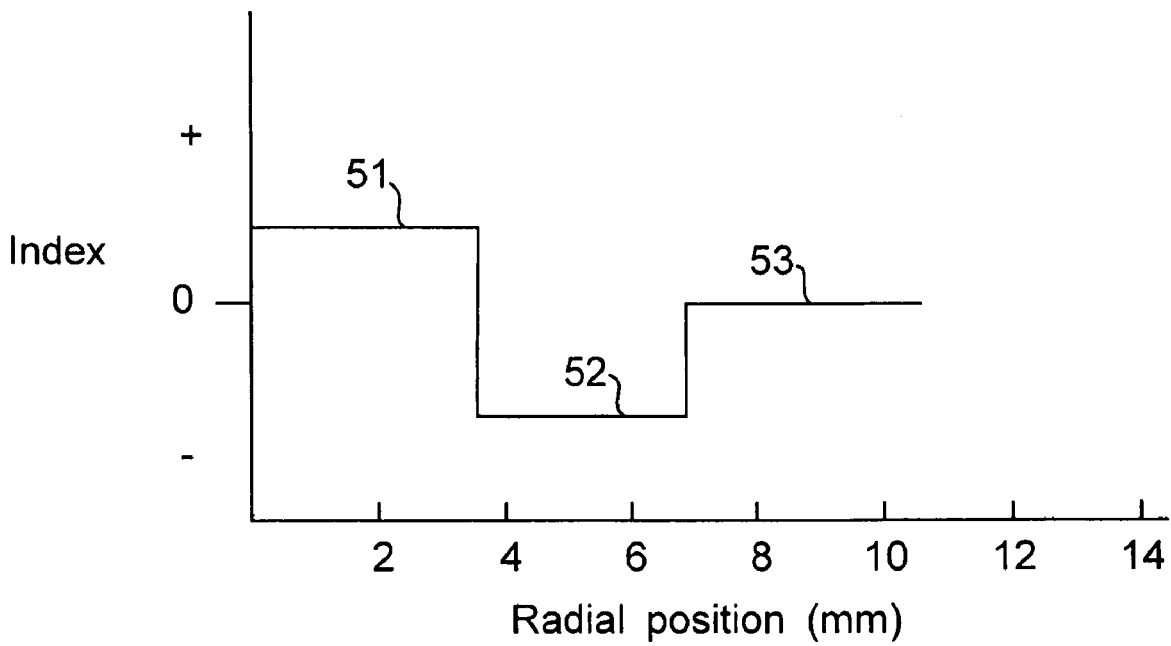

Two typical preform profiles are shown in FIGS. 4 and 5. These are schematic plots and are general, since actual preform profiles are not part of the invention. The Y-axis is the refractive index variation from that of un-doped silica (zero), with up-doping on the + part of the scale and down-doping on the − side of the scale. The x-axis is the position along the radius of the preform with a typical amount of MCVD deposition indicated schematically. In commercial practice, deposited glass diameters in the collapsed preform in the range of 12 to 14 mm are readily achieved by MCVD. As is well known, the profile will be essentially replicated in the drawn fiber, but the plots shown are for the preform. FIG. 4 is intended to show generally a profile with a relatively heavy up-doped core region 41, an un-doped (or neutrally doped) inner cladding region 42, and an up-doped outer cladding region 43. Regions 41 and 43 are typically doped with germanium. There are several options available for producing this profile using the method of the invention. The core rod may be made with just the core material (region 41) extending to the limit of MCVD deposition. At the other extreme, the entire profile may be encompassed within the MCVD deposition. However, as mentioned above, the latter results in preform size limitations. Thus the invention is mainly directed to forming some, but fewer than all, of the core/cladding segments with MCVD. It is also possible to design the process for partial formation of a given cladding segment using MCVD, with the remainder of that segment comprising a cladding tube. In a preferred embodiment, the core and the first cladding segment are made by MCVD, with the remaining segments formed using one or more cladding tubes. For some complex profiles, as many as five cladding tubes may be used.

For example, if the core 41 and the inner cladding 42 are made by MCVD, that would involve 12-14 mm (diameter) of MCVD material.

The profile in FIG. 4 is well known and has been widely used. Other variations in profile design are represented generally by the profile in FIG. 5. Here the center core region 51 is relatively lightly doped with germanium, yielding a high quality low loss core region. The inner cladding layer, 52, is down-doped with F. The outer cladding layer 53 is either un-doped, or up-doped slightly. Again, by substituting appropriately doped overclad tubes for the outer cladding segment or the inner and outer cladding segments, the amount of MCVD core material will be sufficient for a very large preform.

It will be understood by those skilled in the art that the two profiles shown in FIGS. 4 and 5 are just typical of a large number of profile variations now known, or to be developed. These may have more than three core/cladding segments. It will also be appreciated that the ability to form core material to an increased thickness, allows wide versatility in core design.

Figure 6:
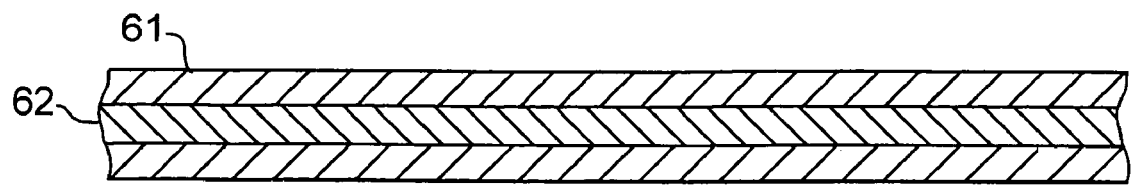
FIG. 6 represents the collapse step in the MCVD process.

When deposition of the profile regions that are to be provided by MCVD is complete the tube is collapsed by known techniques, i.e. heating the tube to above the glass softening temperature, i.e. >2000-2400° C. to allow the surface tension of the glass tube to slowly shrink the tube diameter, finally resulting, after multiple passes of the torch, in the desired solid rod. The collapsed rod is shown in FIG. 6, with the MCVD starting tube shown at 61, and the MCVD deposited core (or core/cladding) at 62.

Next, in accordance with a principle step of the invention, the MCVD tube is removed. This may be accomplished by mechanical grinding, by plasma etching, by chemical etching or by a combination of these techniques. In certain cases, depending on the quality of the starting tube material, it may be permissible to leave a residual amount of starting tube material surrounding the MCVD deposited glass but in a preferred embodiment, all the starting tube glass is removed. The end point of the etching process can be determined from a refractive index profile of the collapsed rod. If the desired profile is similar to that of FIG. 5, with the first deposited layer 53 undoped, there is some margin for error in the case where complete removal of the starting tube is required. The etched preform may be measured after grinding or etching is complete to determine the amount of overetching, which is then factored into the selection of the cladding tube. It will be evident that overetching is preferable to underetching in this case. Accordingly, the MCVD deposition and the etch time may be designed for limited but finite etching of MCVD deposited material.

In general, at least 75% of the starting tube cross sectional area will be removed in practicing the invention. This may be expressed as:

$$((OD_2)^2-ID^2)/((OD_1)^2-ID^2)<0.25$$

where $OD_1$ and $OD_2$ are the outside diameters of the collapsed rod before and after removal, and ID is the inside diameter of the starting tube after collapse. Preferably, according to the invention, more than 90% of the tube is removed, and more typically, all of the tube is removed.

Figure 7:
FIG. 7 represents the step in the inventive process of removing the MCVD starting tube, leaving a core rod adapted for a rod-in-tube method.

After removing the MCVD starting tube, the MCVD deposited glass core remains, as shown in FIG. 7. Before overclad, the surface of the core rod may be cleaned by plasma treatment or by chemical etching to remove any residual OH⁻, and other contaminants. The finished rod may then be inserted in a cladding tube as described above.

As noted earlier, the MCVD process is limited in the total amount of glass that can be deposited inside a starting tube. Typical commercial practice, if directed towards single mode preforms, would result in less than 15 mm of total MCVD deposit (expressed as MCVD glass diameter in the collapsed rod) although somewhat larger amounts can be achieved with special effort. If the intended size of the final preform is large enough, a substantial fraction of that total MCVD deposited material is utilized to form the central core. In that case, significant optical power can extend in the drawn fiber outside the MCVD deposited region and it will be advantageous to perform the overcladding process, or at least the first overclad if a multiple overclad process is used, in a way that assures the optical quality of the interface between the MCVD material and the overclad tube and avoids the generation of a layer of high loss glass. This can be accomplished by controlling the atmosphere in the gap between the MCVD rod and the overcladding tube in much the same way that the original MCVD process carries out the glass forming reaction inside a tube to isolate the glass forming reaction from the environment. In the overcladding case, the overcladding tube with the MCVD derived core rod inside can be attached to an MCVD lathe or similar apparatus and said overclad tube, coupled to the lathe gas delivery system, then provides the isolation form the ambient environment.

Figure 8:
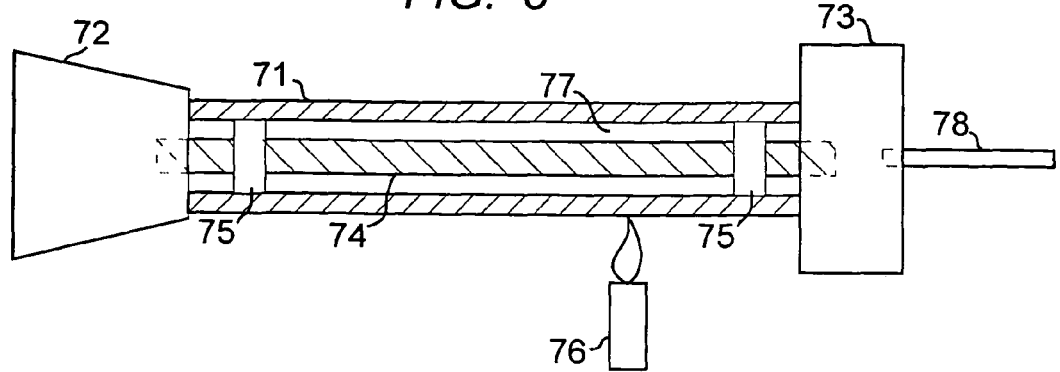
FIG. 8 represents the step of collapsing an overclad tube onto the MCVD glass rod, using a modified MCVD apparatus or a dedicated overcladding lathe, which provides isolation from the ambient atmosphere and where a suitable drying/etching gas or gases can be made to flow in the inner gap during the process.

A suitable apparatus for conducting this step is illustrated in FIG. 8. where a cladding tube 71 is shown supported by lathe elements 72 and 73. Element 71 represents the tube support and exhaust structure, and element 73 is a rotating seal supporting the tube on the inlet side. The core rod is shown at 74 with spacers 75 supporting the core rod within the cladding tube. The spacers are designed to allow gas flow along the tube. The standard MCVD type torch is shown schematically at 76. The atmosphere 77, between the core rod 74 and the cladding tube 71 is controlled in this arrangement and the composition of the controlled atmosphere is determined by flowing gas from gas inlet 78.

A gas composition that is effective in removing hydrogen is introduced into the gap 77 and one or several passes of the heat source 76 along the length of the tube can be made while the gas is flowing. Effective gas ambients would include a drying agent such as chlorine or a drying agent such as chlorine with an etching agent such as a chlorofluocarbon or sulphur hexafluoride to remove a very thin surface layer. A hydrogen/oxygen torch (as schematically shown in FIG. 8) can serve as the heat source but a preferred method is to use a hydrogen free heat source such as a plasma torch or an electrically heated furnace. During these traverses the heat source maintains the tube at a temperature sufficient for effective drying of the interior surfaces but below the temperature at which the tube would collapse onto the rod. After a sufficient number of drying/etching traverses of the heat source, the temperature is increased and the collapse is carried out in one or more passes. After the overclad process is completed, it may be advantageous to remove any residual surface OH on the outside of the overclad preform with either a plasma etch process, a chemical etch process or a combination of the two.

In addition to assuring the quality of at least the first overclad interface, it may be useful to use an ultra-high-purity tube for the first overclad. Ultra-high-purity may, in a preferred case, be defined as having less than 50 ppB hydroxyl ion by weight. This is especially beneficial in the case where significant optical power is carried in the fiber in the region corresponding to this tube, and where a tube of typical quality would introduce noticeable excess loss. As noted above, this tube, since it is only used in an overcladding process, may be of a size or dopant composition that typically would not be used as an MCVD starting tube. Examples include very thin walled tubes, tubes downdoped in refractive index with high levels of fluorine, or tubes updoped in refractive index with germanium. A more elaborate example can be envisioned where an overcladding tube is fabricated with several distinct regions and each region has a different dopant profile to produce a large preform version of a fiber design with multiple cladding structures. Alternatively, the same goal could be approached by a multiple overclad process.

In some cases, it will be advantageous to introduce an elongation step at an intermediate stage of the multiple overcladding sequence. In this elongation step, the glass body, after the completion of one or more overclad steps, is stretched in length and reduced in diameter. Additional overcladding steps may be carried out after the stretching to produce a final preform ready for draw. Inclusion of an elongation or stretching step does not change the fiber kilometer equivalent of the original core rod but can allow a smaller diameter (and longer length) final preform which may be more suited to a particular fiber draw facility.

As just described, the use of an ultra-high-purity first overclad tube is also preferred if the fiber design has enough optical power propagating outside the MCVD region to otherwise adversely affect the fiber loss. The MCVD core glass will typically have a diameter of 12 to 15 mm. The central core region that contains most of the guided light may have a diameter of 6 mm to 15 mm. The overall preform, after applying one or more cladding tubes, may have a diameter of 200 mm or more. Thus the method of the invention provides for a very large preform, with a complex profile structure, in which the core is formed entirely by MCVD. For the purpose of definition, a large preform is considered as one with a diameter of at least 120 mm.

Although in the description so far the MCVD core rod is intended as part of a rod-in-tube method, alternatively the MCVD core rod may be used as a substrate for soot deposition. In this way, cladding layers or partial cladding layers may be deposited using soot techniques.

Although the MCVD process as described above uses a flame torch and a fuel of mixed oxygen and hydrogen, plasma torches or electrically heated furnaces may also be used in these kinds of processes. Also, gas torches other than oxyhydrogen torches can be used.

Figure 9:
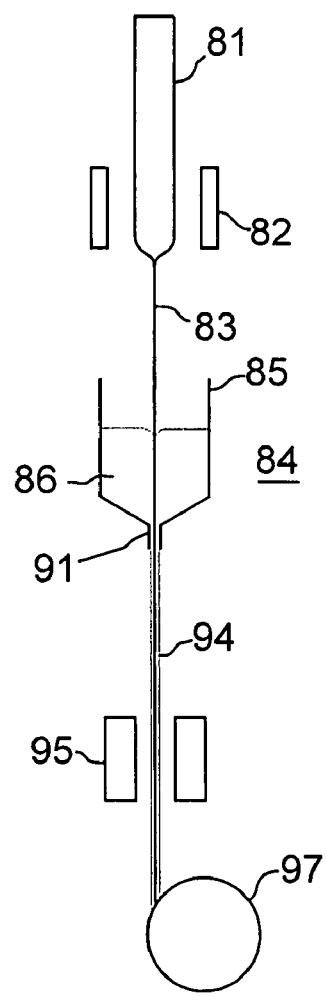
FIG. 9 is a schematic representation of a fiber drawing apparatus useful for drawing preforms made by the invention into continuous lengths of optical fiber.

The optical fiber preform, as described above, is then used for drawing optical fiber. FIG. 9 shows an optical fiber drawing apparatus with preform 81, and susceptor 82 representing the furnace (not shown) used to soften the glass preform and initiate fiber draw. The drawn fiber is shown at 83. The nascent fiber surface is then passed through a coating cup, indicated generally at 84, which has chamber 85 containing a coating prepolymer 86. The liquid coated fiber from the coating chamber exits through die 91. The combination of die 91 and the fluid dynamics of the prepolymer, controls the coating thickness. The prepolymer coated fiber 94 is then exposed to UV lamps 95 to cure the prepolymer and complete the coating process. Other curing radiation may be used where appropriate. The fiber, with the coating cured, is then taken up by take-up reel 97. The take-up reel controls the draw speed of the fiber. Draw speeds in the range typically of 1-20 m/sec. can be used. It is important that the fiber be centered within the coating cup, and particularly within the exit die 91, to maintain concentricity of the fiber and coating. A commercial apparatus typically has pulleys that control the alignment of the fiber. Hydrodynamic pressure in the die itself aids in centering the fiber. A stepper motor, controlled by a microstep indexer (not shown), controls the take-up reel.

Coating materials for optical fibers are typically urethanes, acrylates, or urethane-acrylates, with a UV photoinitiator added. The apparatus is FIG. 9 is shown with a single coating cup, but dual coating apparatus with dual coating cups are commonly used. In dual coated fibers, typical primary or inner coating materials are soft, low modulus materials such as silicone, hot melt wax, or any of a number of polymer materials having a relatively low modulus. The usual materials for the second or outer coating are high modulus polymers, typically urethanes or acrylics. In commercial practice both materials may be low and high modulus acrylates. The coating thickness typically ranges from 150-300 μm in diameter, with approximately 240 μm standard.

Figure 11:
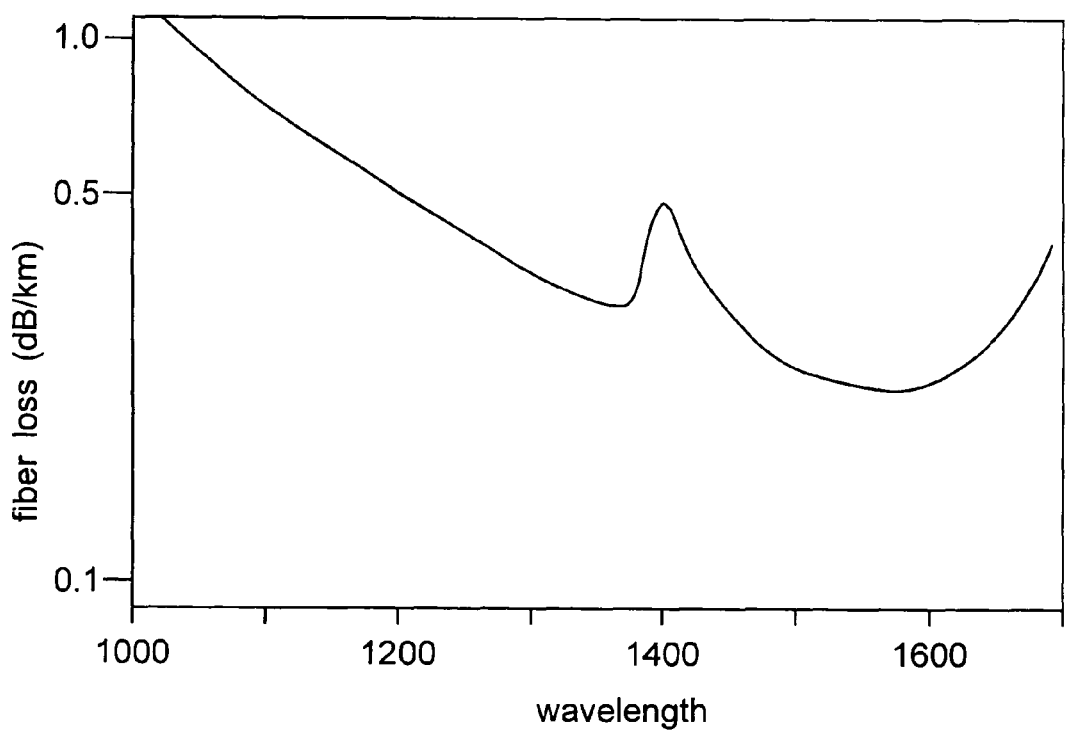
FIG. 11 is a plot of optical loss (dB/km) vs wavelength (nm) for the optical fiber used for the data of FIG. 10.
Figure 10:
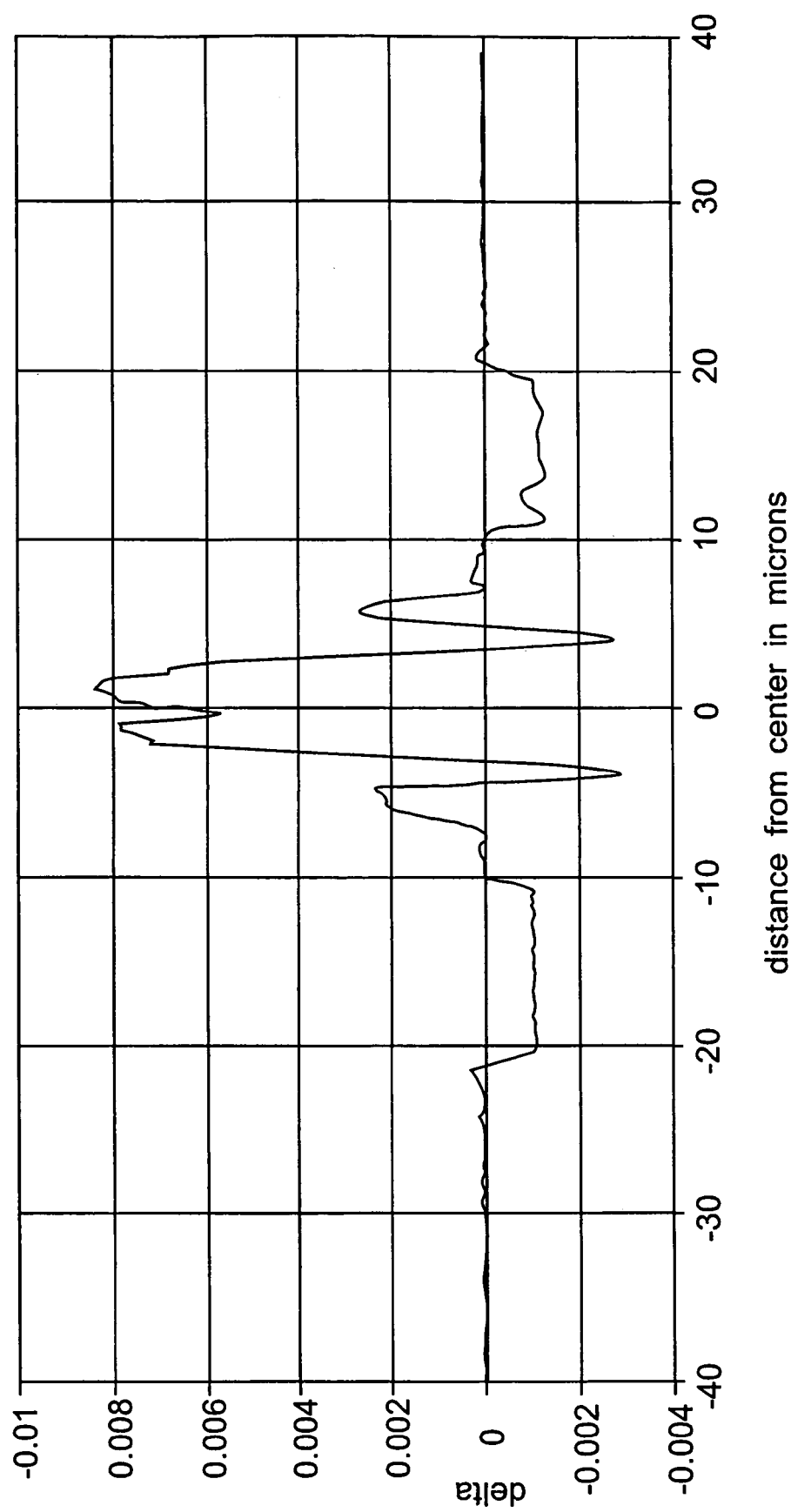
FIG. 10 is a refractive index profile for a typical optical fiber made according to the invention.

As an example of the described process, we have fabricated a preform sized to yield 1500 kilometers of fiber per meter of core rod length. A refractive index profile obtained from a sample of the drawn fiber is shown in Figure X. The graded central core region and the adjacent downdoped inner cladding region were fabricated with MCVD inside an undoped silica starting tube. As described above, after the MCVD collapse step the starting tube was completely removed by a process combining mechanical grinding, plasma etching and chemical etching leaving a core rod of MCVD material approximately 13 mm in diameter. This MCVD glass rod was then overclad with an ultra-pure germanium doped silica overclad tube which provided the updoped cladding region seen in the refractive index profile. This first overclad operation was carried out as described earlier with care to preserve the optical quality of the glass in the interface region. Three more overclad steps, one of which made use of a downdoped overclad tube, along with an intermediate stretching step to size the final preform diameter for a conventional fiber drawing furnace, were used to complete the preform. The optical properties of the fiber drawn from this preform were equivalent to those of fibers with similar refractive index profiles drawn from significantly smaller preforms made with a conventional, prior art MCVD and overclad process. In particular, the optical loss of the fiber drawn from the example preform was equivalent or lower than was typical of fiber drawn from such prior art preforms. To illustrate this point, FIG. 11 shows a spectral loss curve (fiber attenuation vs. wavelength) of a fiber from the example preform.

Various additional modifications of this invention will occur to those skilled in the art. All deviations from the specific teachings of this specification that basically rely on the principles and their equivalents through which the art has been advanced are properly considered within the scope of the invention as described and claimed.

The invention claimed is:

1. Process for the manufacture of optical fiber comprising:
   (a) preparing an optical fiber preform,
   (b) heating the preform to the softening temperature, and
   (c) drawing an optical fiber from the preform,
the invention characterized in that the optical fiber preform is prepared by steps comprising:
   (i) forming by MCVD:
      a first MCVD glass layer on the inside of a MCVD starting tube and
      a second MCVD glass layer on the first MCVD glass layer, where the MCVD starting tube is composed of MCVD starting tube material, the first MCVD glass layer is a first cladding material having a first refractive index and the second MCVD glass layer is a core material having a second refractive index higher than the first refractive index,
   (ii) collapsing the MCVD tube to produce a first solid glass cylindrical body having core material, first cladding material on the core material, and a layer of MCVD starting tube material on the first cladding material, where the layer of MCVD starting tube material has an outside diameter $OD_1$ and an inside diameter ID,
   (iii) removing a portion of the layer of MCVD starting tube material to form a second solid glass cylindrical body of core material, first cladding material on the core material, and a residual layer of MCVD starting tube material on the cladding material, wherein the portion of the layer of MCVD starting tube material removed is expressed as:

$$((OD_2)^2-ID^2)/((OD_1)^2-ID^2)<0.25$$

where $OD_2$ is the outside diameter of the second solid glass cylindrical body, and
   (iv) applying a cladding to the second solid glass cylindrical body by inserting the second solid glass cylindrical body into a cladding tube leaving an ambient space between the solid glass cylindrical body and the overclad tube, controlling the ambient space by flowing gas through the ambient space and collapsing the cladding tube around the second solid glass cylindrical body.

2. The process of claim 1 wherein the overclad tube comprises glass with a hydroxyl ion content less than 50 ppB by weight.

3. The process of claim 1 wherein said overclad tube is up-doped with germanium.

4. The process of claim 1 wherein said overclad tube is downdoped with fluorine.

5. The process of claim 1 where the first solid glass cylindrical body has a diameter of at least 12 mm.

6. The process of claim 1 wherein the portion of MCVD starting tube material is removed by mechanical grinding.

7. The process of claim 1 wherein the portion of MCVD starting tube material is removed by plasma etching.

8. The process of claim 1 wherein the portion of MCVD starting tube material is removed by chemical etching.

9. The process of claim 1 wherein the portion of MCVD starting tube material is removed by any combination of methods of mechanical grinding, plasma etching and chemical etching.

* * * * *